United States Patent [19]
Crochet, Sr.

[11] 3,981,517
[45] Sept. 21, 1976

[54] COUPLING MECHANISM ADAPTED TO LATCH OBJECT TO OBJECT SUBSTANTIALLY COTERMINOUSLY WITH UNCOVERING UNIVERSAL MOVEMENT MEANS BETWEEN OBJECTS

[76] Inventor: Gerald J. Crochet, Sr., 508 Beverly Drive, Lafayette, La. 70501

[22] Filed: Feb. 18, 1975

[21] Appl. No.: 550,854

Related U.S. Application Data

[63] Continuation-in-part of Ser. No. 302,862, Nov. 1, 1972, Pat. No. 3,866,948.

[52] U.S. Cl............................................. 280/478 R
[51] Int. Cl.².......................................... B62D 53/00
[58] Field of Search............ 280/477, 478 R, 478 A, 280/479 R, 479 A, 474, 481, 491 R, 491 A, 492, 493, 494, 415 R; 403/102, 180, 74

[56] References Cited
UNITED STATES PATENTS

| | | |
|---|---|---|
| 3,124,372 | 3/1964 | Poole.................................. 280/477 |
| 3,831,981 | 8/1974 | Poole.................................. 280/479 |

Primary Examiner—M. H. Wood, Jr.
Assistant Examiner—R. Schrecengost
Attorney, Agent, or Firm—Bill B. Berryhill

[57] ABSTRACT

The disclosure is to a coupling mechanism which may be set operative to project means to effect latch engagement between objects, the means also being projected to set operative means to permit universal relative movement between the objects. An exemplary application may be a prime mover with a control valve accessible to driver who can turn the valve to operate a hitch housing assembly to latch with a vehicle, the hitch housing assembly movement also continuing to uncover universal joint members in chain or connection whereby universal connection may be effected between the vehicle and the prime mover that pulls it. Many other applications of the invention are within contemplation, as in the field of connected floated vessels, railroad cars, trailer homes, and the like.

21 Claims, 20 Drawing Figures

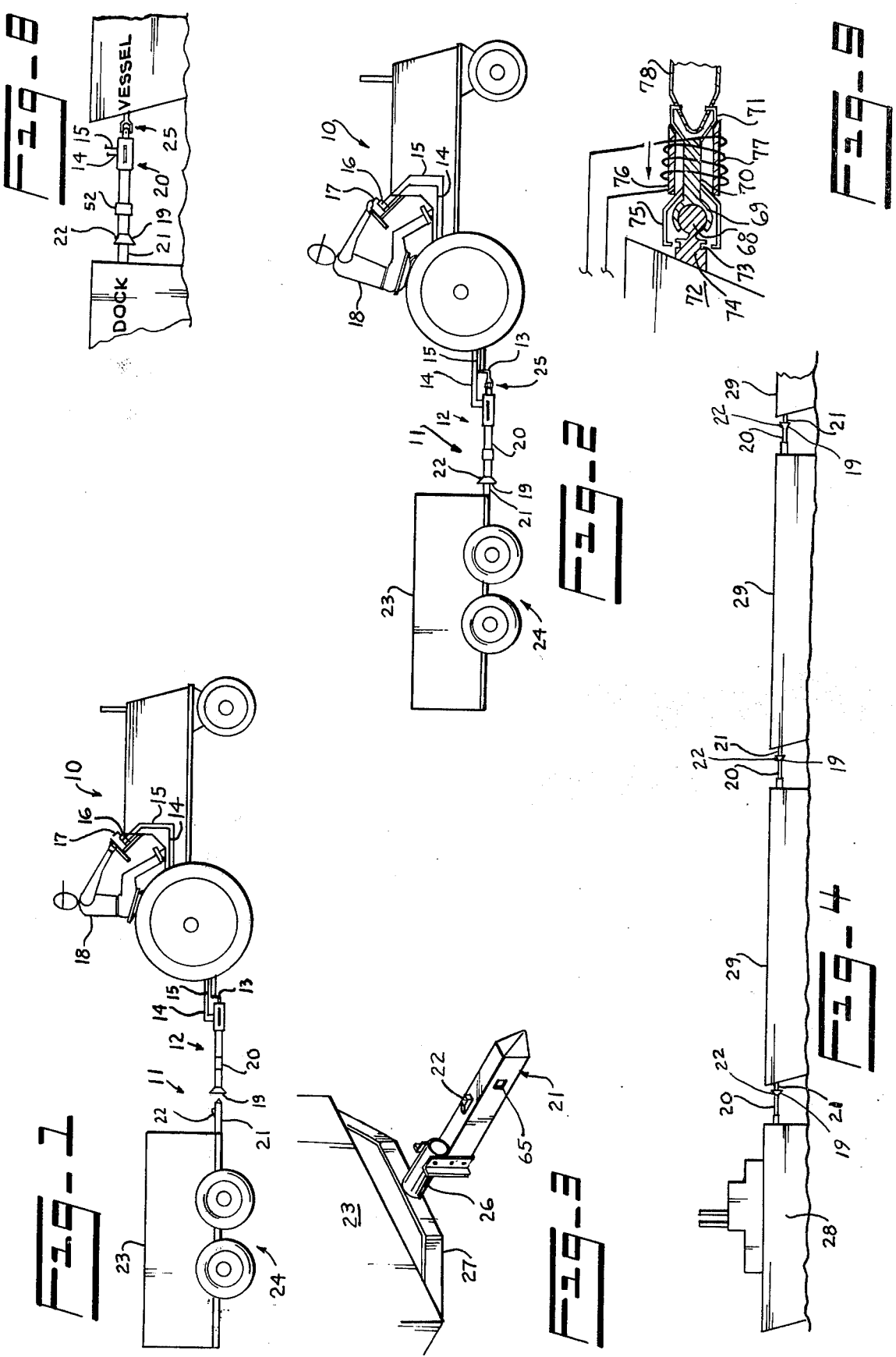

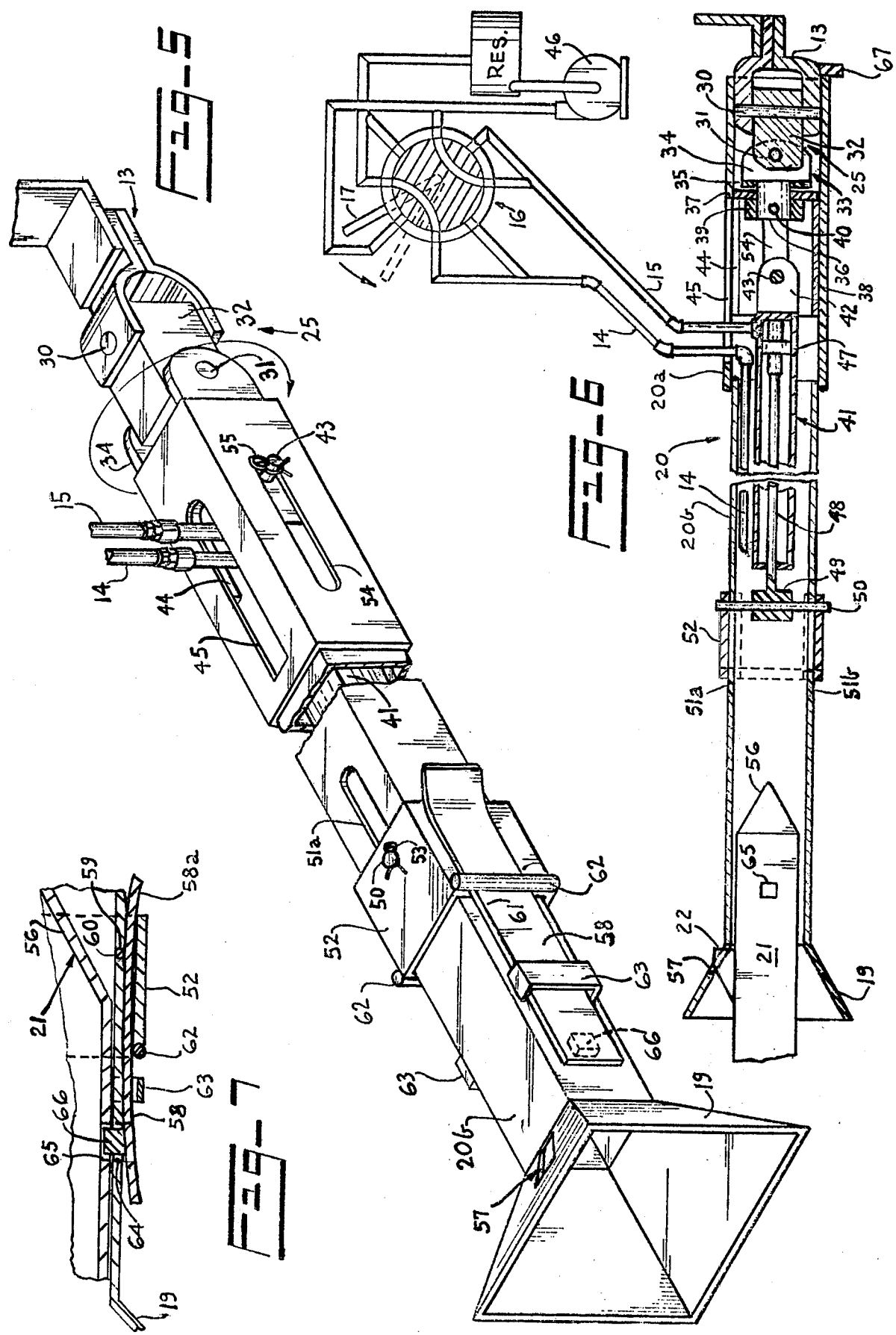

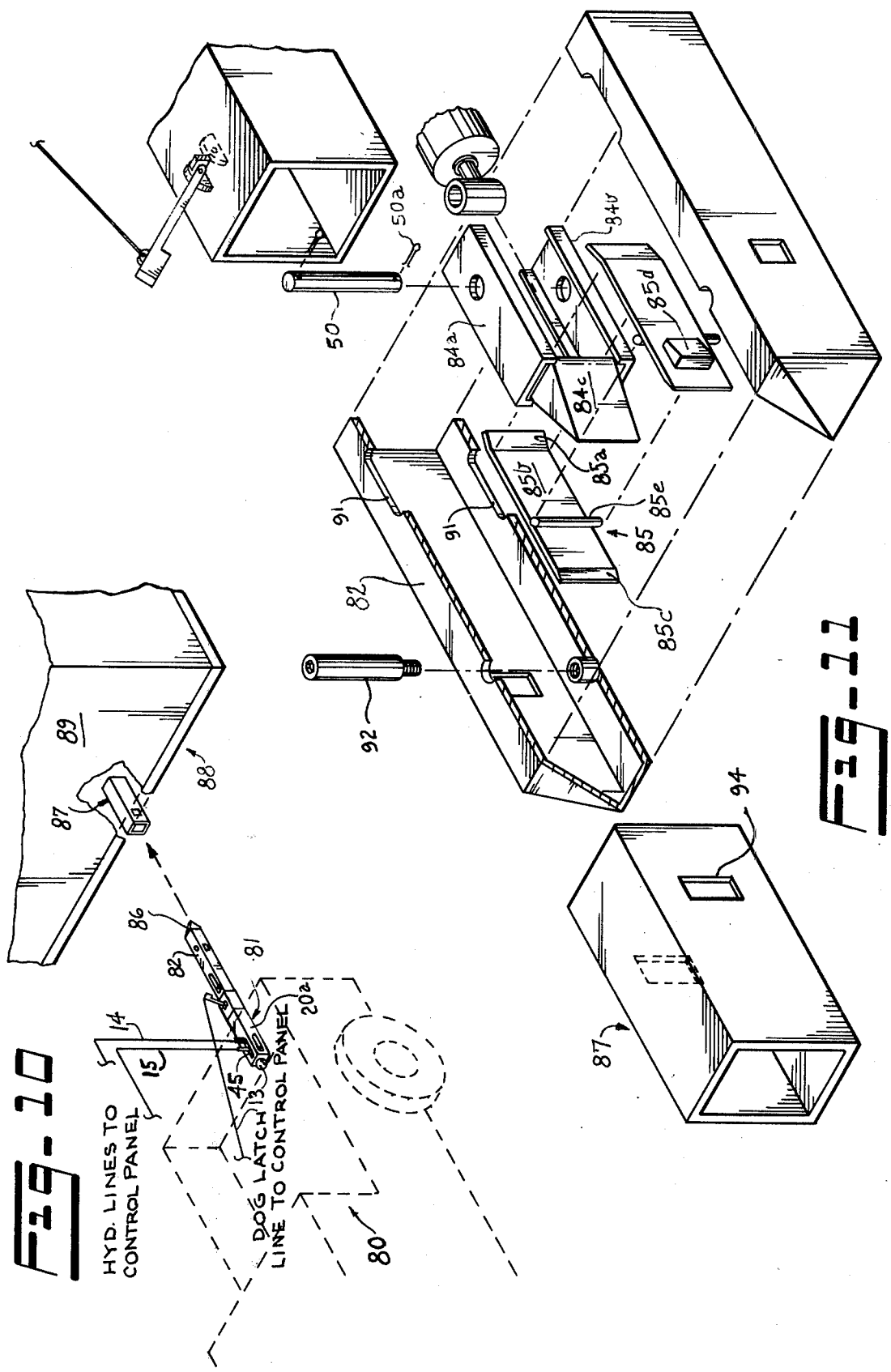

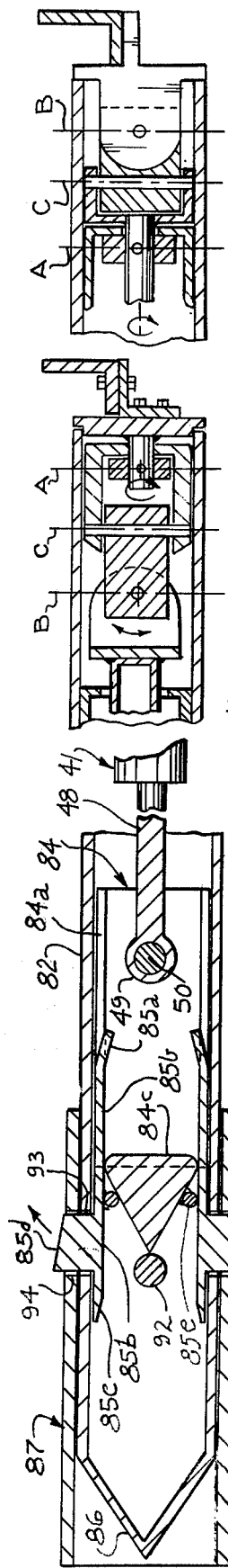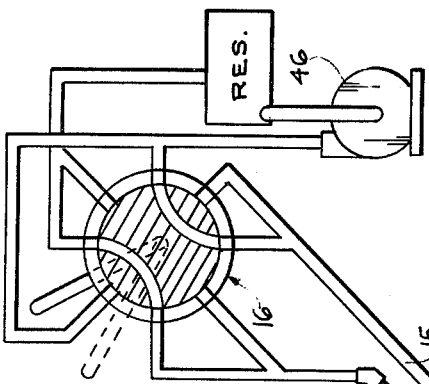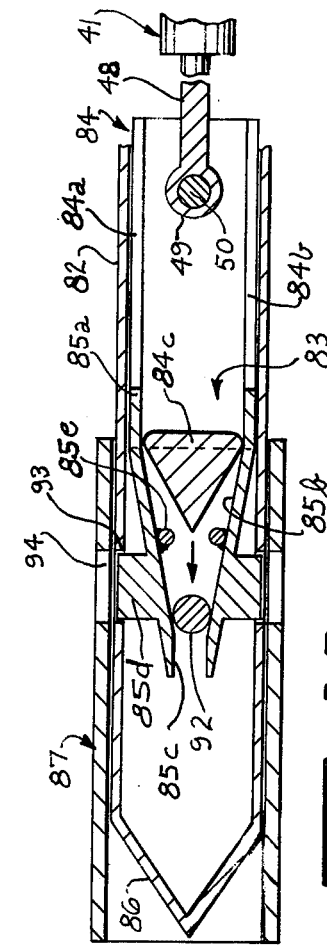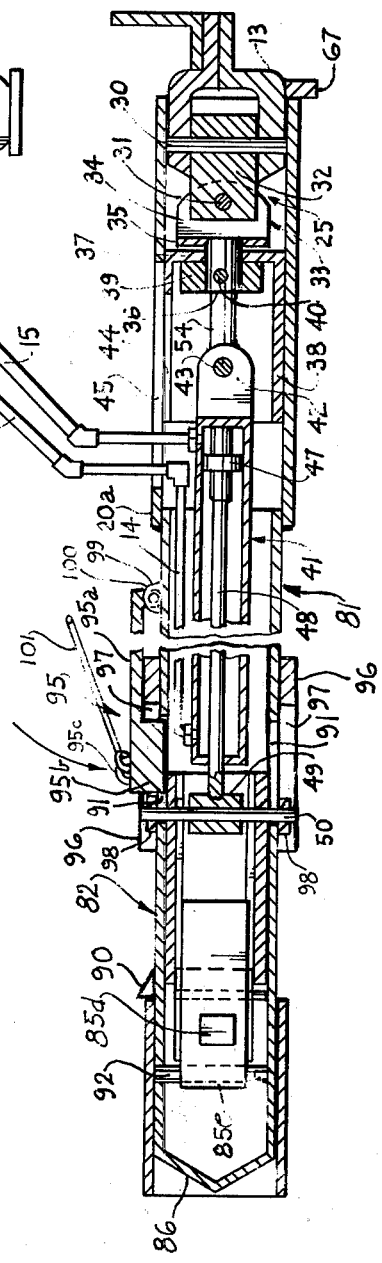

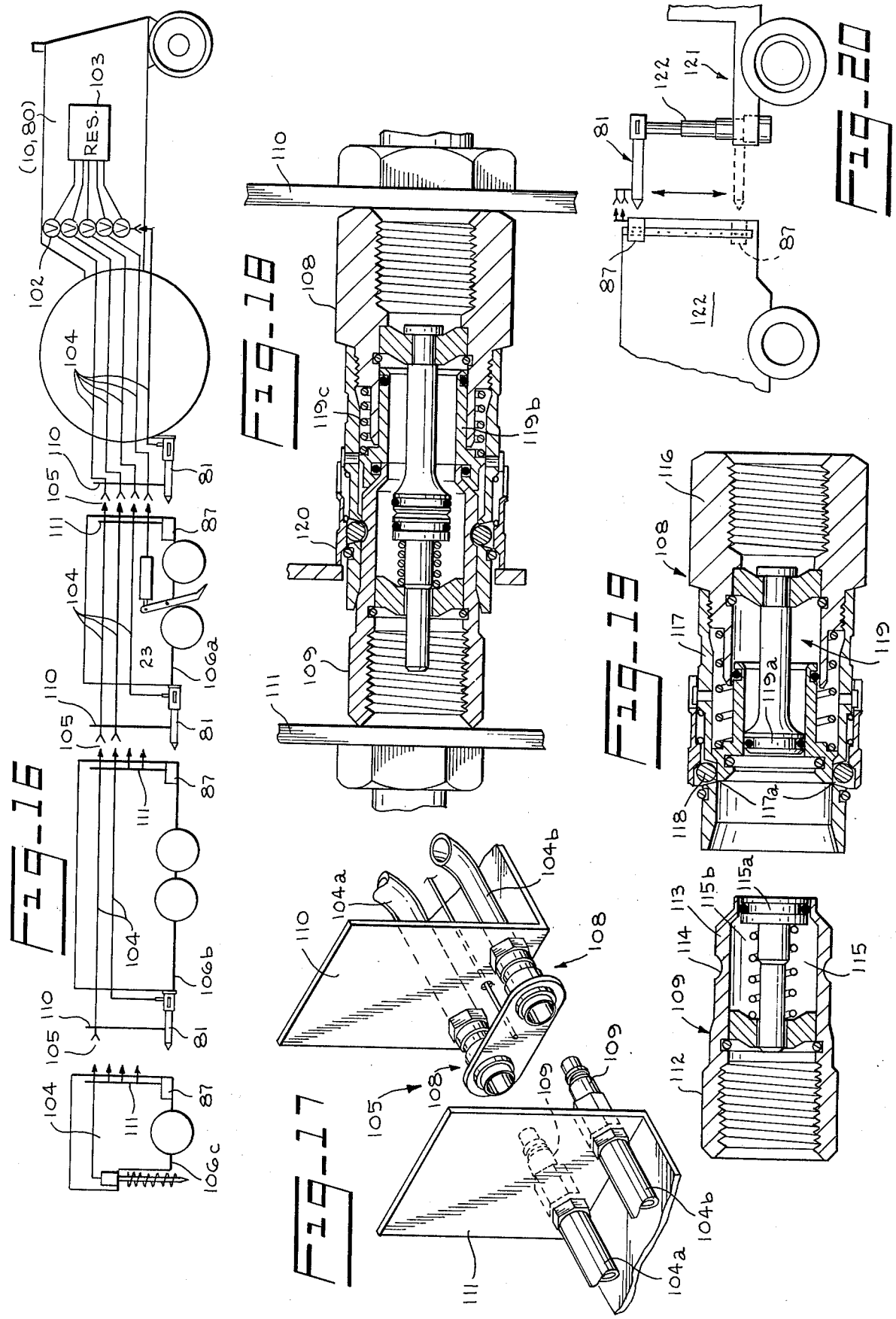

COUPLING MECHANISM ADAPTED TO LATCH OBJECT TO OBJECT SUBSTANTIALLY COTERMINOUSLY WITH UNCOVERING UNIVERSAL MOVEMENT MEANS BETWEEN OBJECTS

This application comprises a continuation-in-part application of Application Ser. No. 302,862, filed Nov. 1, 1972, and now U.S. Pat. No. 3,866,948 for Mechanism with Latching Also with Relative Universal Movement Uncovering Between Objects.

BACKGROUND OF THE INVENTION

As an example of conditions prevailing in the trade, for example, in the field of prime movers and drawn vehicles, heretofore it has been necessary for one man at least to dismount for access to a pin to be pulled to disconnect the universal connection between a prime mover and a drawn vehicle to which the prime mover has been hitched. Usually when this disconnection is made, the drawn vehicle has the universal joint assembly elements attached thereto, and when the pin or connection with the prime mover is pulled by a man on the ground, the universal joint elements fall into an inoperative position.

Later, to make reconnection, one operator is required on the prime mover or tractor, while two or more men are required on the ground dangerously to hold up the universal joint parts and to put in place the pin that connects the universal joint to the conventional drawbar. In British Patent No. 453,944, issued Nov. 6, 1936, a pivotal connection is made to the prime mover.

Need has long existed for a latching and universal joint uncovering that can be effected by a simple motion as from the prime mover operator's seat, while he is at the time free for the operation of the prime mover.

Most recent prior art in any manner early related to this field is U.S. Pat. No. 3,649,048, to Garnett, early in 1972, but in this case an opeator down on the ground between vehicles manually disconnects a hydraulic cylinder before the two vehicles can be universally connected. Also, in recent years, U.S. Pat. No. 3,521,908, issued July 28, 1970 to Carter, shows use of a hitch with a hitch element withdrawn from an enclosing sleeve, whereby the connection between vehicles is rendered flexible. However, this construction fails to provide a means of locking its imperfect universal joint into rigidly cantilevered position, while at the same time unlatching from the drawn vehicle. Also, this construction requires a man on the ground to unhitch the drawn vehicle or wagon.

The present inventions solve the problem of awkwardly, slowly, dangerously and expensively making connections between objects, as between vehicles, between railroad cars, between water borne vessels, between vessels and docks, between tractors and carts or drawn agricultural or construction implements, between prime movers and trailer homes, also between planes, between planes and bliders, between military apparatus, as between helicopters and tanks, between helicopters and other weapons, between special sections employed variously in substantially vertical alignment in oil wells, and in a vast range of other usages.

The invention is, in effect, a unique coupling, having a wide applicability, which can be employed in many types of usages and applications, to connect objects, both horizontally or vertically disposed with relation to each other, or even at various angles in three-dimensional space. The Self-Locking Coupling of the Englishman, Ralph Peters, as covered in U.S. Pat. No. 3,727,958, issued Apr. 17, 1973, has particlar versatility, but lacks the advantages of the applicant's device, which can respond to remote control operation, first to regidly latch two objects together, and then to render them universally connected.

SUMMARY OF THE INVENTION

The present invention relates generally to effecting connection between objects, as, for instance, connection between a prime mover and a cart or implement to be pulled thereafter, the means comprising most versatile coupling apparatus and the method being operative in manner that a releasable latching is made and with coupling structure in chain of connection being conditioned to act as a completely universal connection means between the objects.

As a primary object, the invention sets out to provide means anxmethod of effecting releasable latching between objects; also connection means in chain of connection being rendered operable as a completely universal connection means between the objects.

It is also another and more specific object to provide means and method of this class that will effect latching, as between a prime mover and a cart or implement to be drawn thereafter. In such means and method, a connection means is provided which includes universal joint parts which are at outset sleeved over against movement. These universal joint parts are uncovered just as, or promptly after, latching occurs, so that complete universal relative movement can occur between the elements thus connected.

It is also an additional object of the invention to provide means and method of this class to effect latching and to render connection conditioned for complete universal relative movement between object and object. For example, connections are considered between prime mover and cart or implement; between water borne vessels; between vessel and dock; between aeroplanes including between planes and gliders, between helicopters and tanks or howitzers; between sequences of pushed or pulled objects, as between tug boat pushed canal barges; and as between railroad cars pulled by railroad engines.

The invention also has, as one of its objects, the provision of female connections on drawn objects and male connections on prime mover, oppositely as disclosed in the parent application.

The invention also includes as an addded object, the employment of connections of the type disclosed employable as means for making selective connection, between objects in a chain or sequence, as between tug boat pushed canal barges; or as between railroad cars drawn or pushed by railroad engines; or as between corresponding units in any number of similar sequences.

The invention also includes as an additional object, a safety feature to insure against inadvertent unlatching.

Also, the invention has, as a special object, the provision of a female latch receiving tube flush with the front end of the object to be drawn, as for instance, a trailer home, thus leaving clear and unimpeded access to the front thereof.

Other and further objects will be apparent when the specification hereinbelow is considered in relation to the drawings, forming a part thereof, and which will be briefly described immediately herebelow.

BRIEF DESCRIPTION OF THE DRAWINGS

In the accompanying drawings forming a part of this specification and wherein like reference numerals are applied in the various views to designate like parts, the drawings carried over from the preceding application may be described as follows:

FIG. 1 is a small scale elevational view showing tractor and cart equipped for the employment of an embodiment of the coupling with tractor being backed in direction of cart with the coupling portion rigidly cantilevered behind to receive the tongue of cart therein;

FIG. 2 is a small scale elevational view of the tractor and cart shown in FIG. 1, with hitch housing latched with tongue, and with the universal joint parts of the coupling uncovered, for complete universal movement between cart and tractor, as, in point of time when the tractor is in process of starting forward to draw the cart thereafter;

FIG. 3 is a fragmentary isometric view of the lower front part of a cart, showing a form of tongue construction;

FIG. 4 is a small scale elevational view showing a tug boat connected to a lead barge by a form of the coupling, and thereafter a succession of towed barges thus connected, one to the other;

FIG. 5 is a large scale isometric view of the coupling, showing an embodiment thereof in form of a hitch housing assembly, the universal joint elements being shown as a chain of connection means, fully uncovered, so that complete universal relative movement between two connected objects, can take place.

FIG. 6 is a large scale sectional elevational view, partially diagrammatic, the coupling of FIG. 5, with the rear portion of the hitch housing of the type of construction shown in FIG. 5, having been inserted over a special cart tongue, a valve handle being shown in full line position representative of the fact that the piston in the hydraulic cylinder is just at start of movement (to left) to effect latching of the rear end portion of the hitch housing with the tongue;

FIG. 7 is a sectional plan view taken along line 7—7 of FIG. 6, at stage to show dog latch between hitch housing and tongue;

FIG. 8 is a small scale, fragmentary elevational view, showing an embodiment of the coupling with a tongue extending from a fixed object, as a dock, and with the hitch housing of the coupling releasably latched to the tongue, and with the universal joint members extending in chain of connection from a water borne vessel having been uncovered by the hitch housing thus to permit the vessel complete universal joint movement with relation to the fixed dock;

FIG. 9 is a fragmentary sectional elevational view, partially diagrammatic, of another embodiment of the coupling, with the element corresponding with the hitch housing in FIGS. 1–8, also operative in this view in correspondence with the armature of a solenoid;

The drawings descriptive of inventive matter added by this application may be described as follows:

FIG. 10 is an isometric view, partially diagrammatic, showing a coupling embodiment with a prime mover being backed for male connection engagement into a female connection flush with front end of, and under, a trailer home;

FIG. 11 is an exploded isometric view of the male and female latch parts, as introduced by FIG. 10;

FIG. 12 is a sectional elevational view, partially diagrammatic, of a coupling including a latch assembly which carries the male latching parts introduced in FIG. 10 and shown in the exploded view of FIG. 11;

FIG. 13 is a sectional plan view of the coupling male and female latching parts introduced in FIG. 10, with male parts in movement toward latching position;

FIG. 14 is a sectional plan view of the coupling male and female latching parts introduced in FIG. 10, in latched position;

FIG. 15 is a multiple view, partially in diagram or code, alluding to the six alternative arrangement sequences of universal connection elements;

FIG. 16 is an elevational view, partially diagrammatic, showing a succession of vehicles, as agricultural vehicles or trailer homes, as drawn by a tractor as prime mover;

FIG. 17 is an isometric view, showing typical disconnectable hydraulic line connections as mounted on top of respective male and female parts of two connectable objects, a means also shown by which the hydraulic lines may be disconnected by manipulation at the prime mover panel;

FIG. 18 is a view, part in section, of typical fluid line connection members, that respond to disconnecting manipulation from prime mover control panel, by means not shown, but shown in FIG. 17;

FIG. 19 is a sectional elevational view, showing the typical fluid line members of FIG. 18, as in disconnected relationship;

FIG. 20 is an elevational view, partially diagrammatic, showing the range that a connection tongue between vehicles, may be placed in, selectively, between an uppermost and lowermost position.

BRIEF DESCRIPTION OF THE INVENTION ON FILE

The invention, in a form or embodiment initially most prevalently employed, and carried over by way of continuation, makes use of a coupling including a hitch housing assembly having a latching sleeve connected to outer piston rod end from the piston of a hydraulic cylinder, that extends within the hitch housing, but without connection thereto. At the cylinder end opposite its piston rod, one end element of a chain of universal joint elements is connected to the cylinder, with the other end element being connected to a tractor or prime mover. When a control valve is turned to admit hydraulic fluid into the head of the cylinder, the latching sleeve is moved toward the tongue of a cart, which is to be connected to, and then drawn by the tractor. The tongue has dog holes in the sides thereof and the latching sleeve, as its cross-bar through the piston rod outer end, moves in a short slot in the hitch housing, sets the dots of dog latch bars in the dog holes in hitch housing and tongue, and the tongue and hitch housing are latched together. Further fluid admission causes piston rod movement to move the whole hitch housing toward the cart to which it is now latched, and thus pushes the cart away from the tractor. A long slot in the hitch housing moves with relation to the fluid connection into cylinder as the hitch housing uncovers the universal joint elements whereby relative complete universal connection is effected between tractor and cart.

DETAILED DESCRIPTION OF PREFERRED EMBODIMENTS

Making reference now to the drawings of the part carried over by continuation, for a better understanding of the invention, a tractor 10 is shown in FIG. 1, with mechanism 11 beind including a hitch housing assembly 12 that appears rigidly cantilevered rearwardly of the tractor at the level of its drawbar 13, the forward element of the hitch housing assembly 12, to be hereinbelow described in detail, being rigidly connected to parts of drawbar 13. Fluid conduits 14 and 15 are shown extending upwardly and forwardly from the hitch housing assembly 12, with the same conduits 14 and 15 being shown forwardly in the tractor 10 and extending to a valve 16 with handle 17 in hand reach of the driver or operator 18.

The guide funnel of the hitch housing 20 of the hitch housing assembly 12, is indicated as comprising its rearmost element, and this guide funnel 19 is indicated in FIG. 1 as disposed, upon further rearward movement of the tractor 10, to receiver the point and thereafter the forward portion of a tongue 21 having a stop lug 22 on the upper surface thereof. The cart 23 that provides the tongue 21 forwardly, is shown mounted on a set of tandem wheels 24, this type of cart or wagon 23 being well known in agricultural usages, as for hauling rice, sugar cane, or other agricultural products.

As shown in FIG. 2 the operator of the tractor is shown as having his hand on the valve handle 17, the hitch housing 20 has moved rearwardly in extent to so that only the rear portion of the tongue 21 can be seen, while the stop lug 22 is visible in small part forwardly in the guide funnel 19.

In the view of FIG. 2, universal joint parts, comprising a universal joint assembly 25, in front of the forward end of the hitch housing 20, since it has now moved rearwardly, are now visible and represent that part of the hitch housing assembly 12 which the aforesaid rearward movement of the hitch housing 20 has uncovered. As will be hereinbelow described, these parts are so constructed and related that the cart or wagon 23 can move relatively in three planes with relation to the tractor 10.

As shown in FIG. 3, a tongue 21 is shown connected to the stub 26 of a conventional tongue, as for purposes of mounting the tongue 21 at proper elevation for entry into the guide funnel 19. On the other hand the tongue stub 26 extends forwardly from a conventional mounting bracket 27 on the lower, forward part of the cart or wagon 23.

FIG. 3 shows the above described apparatus employed in an alternative usage, with a tongue 21 extending forwardly toward a tugboat on towboat 28, as installed to extend substantially horizontally from the bow of a barge 29, the tongue 21 being latched into the rear end portion of a hitch housing 20. Also a hitch housing 20 is shown extending rearwardly from, or cantilevered from the stern of each successive barge 29, in chain behind the tugboat 28, with a tongue 21 extending substantially horizontally forwardly from the bow of each barge 29, and engagement with the hitch housing 20 immediately in advance thereof.

Considering together FIGS. 5, 6, and 7, the hitch housing 20, in FIG. 6, is shown in its most forward extend, with a forward portion 20a enlarged in cross-section thus to fit snugly over an element generally termed the tractor drawbar 13, which is drilled through centrally, vertically to provide a first pivot bore for a pivot pin 30 of the universal joint assembly 25; the first pivot pin 30 also passing through a block 32 interposed between upper and lower draw bar parts, as shown in FIG. 6.

A transverse, horizontal bore is drilled through the block 32 comprising, rearwardly of the first pivot, the second pivot bore for a pivot pin 31 of the universal joint assembly 25.

Thus, the pivot pin 31 passes horizontally through the block 32 at right angles to the axis of the pin 30 and connects the block 32 to a swivel assembly 33. The swivel assembly 33 comprised of a pair of ears or wing elements 34, through which the pin 30 passes on opposed sides of the block 32, the ears being spaced apart and connected by a vertical plate 35 of rectangular cross-section. As shown in FIG. 6, the clear height in the housing portion 20a is greater than the height of the vertical plate 35, but the transverse distance from outer side of ear 34 on one side to the outer side of ear 34 on the other side is within snug sliding clearance measurement of the clear width across the housing portion 20a, inside to inside dimension. Also, the height of the plate 35, shown upright in FIG. 6, is substantially equal to this inside to inside width dimension of the housing portion 20a, minus slight sliding tolerance. The swivel assembly 33 also comprises a swivel pin 36, passed centrally through the plate 35 and affixed rigidly thereto, as by welding, with the swivel pin 36 passing with rotatable clearance through a plate 37, of rectangular cross-section that fits, with slight clearance tolerance, within the housing portion 20a. The plate 37 comprises the forward end closure of a guiding adapter box 38 that fits with sliding clearance within the housing portion 20a. The swivel pin 26 extends within the box 38 and has a round nut 39 affixed thereto, as by a screw member 40 that is threaded through the nut 39, these elements thus completing the swivel assembly 33.

A hydraulic cylinder 41 has ears 42, or optionally a single lug 42, through which a draft pin 43 is passed rigidly to connect the hydraulic cylinder 41 to the guiding adapter box 38. A slot 44 is shown extending longitudinally, centrally, for the length of the box 38, up to the end plate 37, while a slot 45 in the housing portion 20a immediately above the slot 44 terminates forwardly at the same point longitudinally forwardly, while such slot 45 extends rearwardly to a distance substantially near the rearward end of the housing section 20a, for a purpose to be hereinbelow described.

As shown in FIG. 6, the valve handle 17 is represented in full line position, as just having been turned to this position from a reverse or from an intermediate or neutral position to establish fluid delivery from a pump 46, as provided by the tractor 10, the fluid to pass through the valve 16 and by way of the conduit 15 into the head of the hydraulic cylinder 41 just above its piston 47, shown in FIG. 6 at head of stroke. Thus fluid return is shown from very near the bottom of the cylinder 41, by way of return conduit 14, through the valve 16, to the reservoir RES., from which the pump 46 takes suction.

The piston rod 48 is shown in FIG. 6 as passing through the base of the hydraulic cylinder 41, and as having, outwardly thereof, a cylindrical yoke 49, with a draft pin 50 passing therethrough, the draft pin 50 extending outwardly through opposed slots 51a (upper) and 51b (lower) in the reduced dimension hitch housing portion 20b. A tongue latch sleeve 52 is shown in FIGS. 5 and 6 as slidable upon the housing portion 20b, a cotter pin 53 being shown in FIG. 5 as passed transversely through the upper end of the draft pin 50, with a corresponding cotter pin, not shown, being assumed as passed through the lower end of the draft pin 50. In passing, back reference may be made to slot 54, FIGS. 5 and 6, with the draft pin 43 extending transversely outwardly through the slot 54 in FIG. 5, and with a cotter pin 55 being shown as passed transversely through the end of the draft pin 43, the opposite side providing a corresponding slot for the draft pin opposite end to pass through to be retained by a corresponding cotter pin.

Reiterating and expanding upon conditions recited as represented in FIG. 6, a tractor 10 has been backed to direction that first the tongue point 56 of the tongue 21 extending forwardly from a vehicle or cart 23 to be engaged, has been enshrouded by the guide funnel 19 of the hitch housing rear portion 20b, and as the tractor 10 is backed further the tongue 21 is received into the hitch housing rear portion 20b and into a stop slot 57 in the forward, top plate of the guide funnel 19, and the rear end face of the hitch housing portion 20b engages against the forward face of the stop lug 22. This occurrence is a signal to the operator 18 that the two vehicles 10, 23, are in proper relative position to be latched together. The operator 18 now turns the valve handle 17 to the full line (forward in FIG. 6) position so that hydraulic fluid is delivered into the head of the hydraulic cylinder 41, thus to exert fluid pressure on the forward face of the piston 47 and urge it rearwardly. Consequently the piston rod 48 moves rearwardly out of the cylinder 41 and slides rearwardly the tongue latch sleeve 52 as the draft pin 50 moves rearwardly in the opposed upper and lower slots 51a, 51b.

Now considering FIG. 7 in relation to FIG. 6 and especially in relation to FIG. 5, opposed dog carrying cam bars 58 are mounted on either side of the rearwardly disposed part of the reduced dimension, rearward hitch housing portion 20b, the construction and operation of the right side cam bar 58 being hereinbelow set forth in detail. Obviously, the oppositely disposed cam bar is correspondingly constructed and operated.

The housing portion 20b has a pivot slot 59 provided therein through the side thereof to receiver therein a vertically disposed pivot rod 60 that is affixed to the inner face of the cam bar 58. The cam bar portion outwardly of the pivot rod 60 is best shown in FIG. 5 as disposed in a longitudinally extending slot 61 through the side of the tongue latch sleeve 52, this slot 61 being best visualized by a consideration of the isometric view of FIG. 5. The upper and lower parts of the tongue latch sleeve 52, are shown held together by vertical cam bars or rods 62.

The cam bar 58 is shown in FIG. 5 as extending further rearwardly along the side of the hitch housing portion 20b, and through a guide and retaining bracket 63 that extends out sidewardly from the side of the hitch housing portion 20b, the oppositely disposed bracket 63 also being visible in FIG. 5. Rearwardly of the bracket 63 a dog slot 64 is provided in the rear hitch housing portion 20b, and a matching or mating slot 65 is shown in the tongue 21. In the rearwardly projected position of the tongue latch sleeve 52, a dog 66 attached to the inner face of the cam bar 58 is shown extended inwardly into tongue latching position and thus through the cam bar slot 64 and at least into the slot 65 in the tongue 21. A consideration of FIG. 7 will show that this dog latching through hitch housing into tongue has resulted as the portion of the cam bar 58 rearwardly of the pivot rod 60 has been tracked inwardly in passage between the cam bar rod or rod cam 62 and the hitch housing side, the pivot rod 60 serving as pivot for the cam bar 58, as its name implies.

The forward end portion 58a of the cam bar 58 is normally curved outwardly, as best seen in FIG. 5. It can thus be seen that unlatching of the dog 66 will be effected if the tongue latch sleeve 52 is moved forwardly to urge the forward part of the cam bar 58 sidewardly inwardly. As this occurs, or to accomplish this result, the cam bar rod or rod cam 62 moves forwardly over the outer surface of the cam bar 58, while the cam bar 58 pivots about its pivot rod 60. Thus the rearward part of the cam bar 58 swings outwardly until stopped by contact with the vertical plate of the retaining bracket 63, the dog 66 being withdrawn outwardly from slot engagement.

It can be visualized that when the yoke pin 50, in rearward movement of the tongue latch sleeve 52, reaches the rear ends of the opposed upper and lower hitch housing slots 51a, 51b, any further rearward movement of the piston rod 48 must urge the whole hitch housing 20 rearwardly. As determined by design, total piston rod travel must be greater than, or at least equal to, the sum of yoke pin 50 travel in slots 51a, 51b, and travel to uncover universal joint 25.

As shown in FIG. 5, after the tongue latch sleeve 52 has been moved to latch the dogs 66 in the tongue 21, the yoke pin 50, as urged further rearwardly, has urged the forward hitch housing portion 20a rearwardly to uncover a pin 30 and the block 32 through which it passes, whereby the block 32 can freely swivel in the horizontal plane from side to side. Also, further hitch housing rearward movement has uncovered the pivotal cross-pin 31, and the ears and plate 34, 35 of the swivel assembly 33 so that a drawn vehicle can swivel or bounce up and down or pivot in a vertical plane about the pivot axis 31. Also, the drawn vehicle could swing completely around about a longitudinally rearwardly directed swivel axis, as that axis of the swivel pin 36. In effect, the drawn vehicle 23 could turn completely over sidewardly and complete 360° of turning and erect itself again. In this regard, since FIG. 5 is an isometric view, the swivel assembly plate 35 is not visible, but the description of uncovering includes the swivel assembly plate 35 (from which the ears 34 estend forwardly) as being an element that has to be uncovered to arrive at completely free universal motion relatively permitted between the tractor 10 and the drawn vehicle or implement, as the cart 23.

When it is desired to unlatch from a drawn vehicle or implement the operator 18 turns the valve handle 17 (rearwardly in FIG. 6) to broken line position, so fluid is delivered into the rear end of the hydraulic cylinder 41, to urge forwardly against the rear face of the piston 47 so that the piston rod 48 begins to be drawn back into the cylinder 41, and the draft or yoke pin 50 draws the tongue latch sleeve 52 forwardly, the rear portions of the cam bars 58 swinging outwardly to throw the dogs 66 out of engagement, as these cam bars 58 pivot about their pivot pins 60. When moved sufficiently forward, the tongue latch sleeve yoke pin 50 comes into contact with the forward end surface of the hitch housing slots 51a, 51b.

Noticeably, in uncovering the universal joint assembly 25, the rearward movement of the hitch housing 20, as connected to the tongue 21, has either resulted in the cart or drawn vehicle or implement 23 having been pushed rearwardly the amount of travel required to uncover the universal joint assembly 25. Now, upon disengaging, after dog unlatching has been effected by tongue latch sleeve forward movement, the tongue 21 is still in the same position relative to the hitch housing 20 as it was in when latched. Now, as further fluid is admitted into the lower or rearward end of the hydraulic cylinder 41, the hitch housing 20 is urged forwardly by the yoke pin 50, as the tongue 21 is uncovered by the rear portion 20b of the hitch housing 20 being moved forwardly from around the tongue 21. Also, as this occurs the forward hitch housing portion 20a first moves about and latches therewithin the swivel assembly plate 35, and latches in inner, sideward abutment with the swivel ears 34, then latches around the block 32, and extends to position over and under the drawbar 13, the inner side faces of the hitch housing portion 20a being in abutment with the side faces of the parts of the drawbar 13, as can best be visualized from a consideration of FIG. 5. In this forward position the forward end face of the forward hitch housing portion 20a is in contact with a stop lug 67 on the drawbar 13. As the hitch housing 20 has been moving forwardly, the respective slots 45 and 54 have been moved forwardly with relation to the fluid conduits 14, 15, and the draft pin 43 at the head of the hydraulic cylinder 41. See FIGS. 5 and 6.

In cases where the load to which the hitch is made may be extremely heavy, or in cases where a fixed object, of a DOCK, FIG. 8, is latched to, then after, or as latching occurs, the lead vehicle, tractor, vessel or the like, as the VESSEL in FIG. 8, can and will be urged forwardly or away from the object to which hitch has been made. This is obvious, since if the piston rod 48 is brought to a stop, as with the yoke pin 50 at the ends of slots 51a, 51b, and with the object to which hitch is made immovable, then, if hydraulic fluid continues to be admitted into the head of the cylinder, FIG. 6, the hydraulic cylinder 41 must move forwardly urging through the universal joint assembly of parts 25, and through the drawbar 13, to whatever the drawbar 13 is attached, to push this object outwardly, the universal joint parts moving out of the hitch housing 20, the fluid conduits 14, 15, for this illustration assumed to be rigidly piped from the vessel, moving with the VESSEL and hence outwardly with relation to the slot 45.

The invention is not limited to universal joints comprised of mechanical parts, as the universal joint assembly 25 hereinabove described, and a form of the invention is shown diagrammatically in FIG. 9 in which a ball 68 in a socket 69 on a rod or shaft 70 having latch springs or fingers 71 on its end opposite the ball 68, comprises the longitudinally centrally extending core of the invention. The prime mover 72, corresponding with the tractor, pulling, or towing object, is indicated as a water borne barge in FIG. 9 having an annular connection groove 73 in the horizontally extending stern post 74 that carries the ball 68 as its outermost member. Spring like latch fingers 75, shown larger than the fingers 71, extend forwardly and are oppositely affixed to the forward part of the rod or core 70, just rearwardly of the socket 69. A sleeve 76, around the core or rod 70, corresponds with the armature of a solenoid, with wiring 77 therearound empowered from the barge 72.

As shown in FIG. 9, the sleeve type armature 76 has been projected outwardly to latch the outer latch fingers 71 in a drawn object 78, as a skow or raft, while the forward latching fingers 75 are unlatched from within the groove or latch openings 73 so that the universal joint parts 68, 69, are uninhibited and can thus permit free relative universal movement between the objects 72, 78. Now the switch to close circuit to the wiring 77 may be reversed, thus to move the solenoid sleeve 76 forwardly, thereby to urge the latch fingers 75 into the groove or latch openings 73, thus immobilizing the ball and socket joint 68, 69, from permitting movement therein between. At the same time the outer latch fingers 71 are released as the solenoid sleeve 76 move out of contact with these fingers, and the sleeves are freed to spring outwardly and disengage the skow or raft 78. Conversely, change of direction of operation of solenoid functions, as by switch operation aboard the barge 72, restores condition shown in FIG. 9, with solenoid sleeve 76 moved rearwardly, raft 78 latched to be towed, and universal joint 68, 69, unimpeded in operation.

BRIEF DESCRIPTION OF THE INVENTION, AS ADDED

The added or new part of the application primarily discloses a hitch housing assembly with hitch housing operated by a hydraulic piston-cylinder device with fluid controlled from the prime-mover driver's seat, the piston rod of the piston-cylinder device being adapted to extend male elements into latching engagement with a female receptacle mounted on the object, vehicle, or vessel to be moved by the prime mover.

There is also added a "fail safe" or safety provision, whereby, with latching effected, inadvertent unlatching may be forestalled, by activating such safeguard from the prime mover driver's seat, whereafter, with action reversed, as by accident, the objects will remain latched as the universal joint parts are covered to render connection substantially rigid.

Additionally, in the field of trailer homes, the female receptacle that receives the male latching parts, may be installed flush with the front of, and below the trailer home floor, thus leaving easier and more ready accessibility foor front door entry to the trailer room, and for the installation of auxiliary structures, as removable porches or steps, when the trailer home is conventionally at reast at location, and not in transit.

Also, there is provision for the use of the hereinabove described type of hitch housing included male part and female receptacle connection arrangement, for actuation from a prime mover for a sequence of objects, as canal barges pushed by a tug boat, or as railroad cars or other chains of objects drawn behind the prime mover. In this case a safe guarding means is provided, whereby, in emergency, as above described, the hydraulic fluid line actuating the hydraulic piston of a selective connection, may be disconnected by manipulation at the prime mover panel.

As a noticeable feature, where the aforesaid safeguarding or "fail safe" device has been put in operation, especially in ground engaging agricultural implements or carts, there results weight transfer from the object engaged by the prime mover with substantial rigidity, thus to give added traction to the prime mover, this feature being exercisable whenever desired.

DETAILED DESCRIPTION OF ADDED PREFERRED EMBODIMENTS

In FIG. 10 a prime mover 80 is shown in broken lines, as a truck, having a hitch housing assembly 81 cantilevered rearwardly from its drawbar 13 and indicated substantially diagrammatically, at the stage shown, the elements forwardly correspond with the elements shown in the unlatched, rigidly cantilevered portion of the hitch housing assembly of FIG. 6, hold the same relationships or are in the same stage of operation, and are designed by reference numerals in correspondence with FIG. 6. Thus, in FIG. 10, the housing assembly 81 is indicated as bearing position with relation to hydraulic fluid lines 14, 15, so that hey are adjacent the rear end of the housing slot 45.

The housing assembly 81 includes a forward housing section 20a, (correspondingly as shown in FIGS. 5 anad 6), and a rear housing section 82, FIGS. 11-14, inclusive. Within the rear housing section 82, male parts in combination comprise a male assembly 83 which includes a projector or plunger 84 with the cylindrical yoke rod or bolt 50 passed vertically through the plunger, and through the cylindrical yoke 49 to which the outer, rearward end of the piston rod 48 is attached. As best indicated in FIG. 11, the plunger 84 includes an upper, downwardly facing channel 84a, a lower, upwardly facing channel 84b, the channels 84a, 84b, being connected forwardly by plunger wedge 84c with the swage or point line of the wedge directed rearwardly.

The channels 84a, 84b, have their webs disposed in horizontal planes, and between the channel flange end faces on either side, a dog cam plate 85 is disposed to upstand, as retained on outer side faces by the inner, vertically disposed side surfaces of the rectangular cross-sectioned housing section 82.

Thus, the dog cam plates 85, over the forward part of their lengths, are disposed in tracks or ways, which are moved with relation thereto, as will be hereinbelow described. The prime mover 80 is first backed rearwardly to dispose the pyramidal pointed rear end 86 of the rear housing section 82 in the rectangularly cross-sectional female member or receptacle 87, shown in FIG. 10 as mounted under the floor of a trailer home or house trailer or camper 88, with the rear end face of the receptacle 87 flush with the front end face or wall 89 of the object 88 that is to be moved or drawn after the prime mover 80. Further backing of the prime mover 80 disposes the rear housing section 82 in the position shown in FIG. 13, with the rear housing section point 86 near the rear end of the receptacle 87 which is of inner dimensions in cross-section, slidably to receive the rear portion of the housing rear end section 82 therein. At the point of rearward insertion shown in FIG. 13, a stop lug 90 on the top surface of the rear housing section 82 comes into contact with the forward end face of the receptacle 87, see FIG. 12.

After this occurs the piston rod 48 is urged rearwardly by fluid admitted through the conduit 15 into the head of the hydraulic cylinder 41, fluid return being from the rear end of the cylinder 41 via the return conduit 14. The upper and lower plates of the rear housing section 82 have opposed slots 91 therein, corresponding in function to the slots 51a in the housing section 20b, FIG. 5. The ends of the draft pin or rod 50 move from the forward to the rearward ends of these slots 91 to effect latching of hitch housing assembly 81 with the receptacle 87, to be hereinbelow described.

As indicated in FIG. 11 cotter pins 50a, provided through the ends of the draft pin 50, rest upon washers, now shown, of greater diameter than slot 91 width, complete draft pin assembly with the rear housing section 82, the draft pin 50 passing, as aforesaid, through the upper and lower channels 84a, 84b, of the plunger 84. Optionally, as indicated in FIG. 12, modified U-shaped plates 96 are shown mounted on respective upper and lower plates of the rear housing section 82. The slots 97, between the parallel arms of the U-shaped plates, are wider than the slot 91 widths in the rear housing section 82. Rather than the cotter pins 50a shown in FIG. 11, rectangularly shaped cross-bars 98 are employed, having press-fitted centrally therethrough the ends of the draft pin 50. The cross-bars 98 thus ride guidably, slidably upon the housing section upper and lower plates responsively as the draft pin 50 is urged by the piston rod 48.

The draft pin 50, as the piston rod urged, moves the plunger or plunger assembly 84 with relation to the rear housing section 82, as it moves in the aforesaid slots 91, until the plunger wedge 84c is stopped by contact with a stop pin 92 vertically disposed near the rearward end of housing section 82 as shown in FIG. 14, such stop pin 92 also being shown in FIGS. 11-13, inclusive. The dog cam plates 85 have forward end parts 85a which are bent at a slight predetermined angle toward each other or toward the longitudinal axis of the hitch housing assembly 81. Rearwardly of these parts 85a, the cam plates 85 comprise substantially straight, much longer portions 85b with rear ends 85c tapered for camming guidance upon contact past the plunger contact pin 92, FIG. 13.

The dog cam plates 85 carry dogs 85d, which are substantially square in cross-section, and which are set, as urged outwardly through latch slots 93 through the sides of the rear housing section 82, and through matching latch slots 94 through the sides of the receptacle 87. As the plunger wedge 84c moves rearwardly it contacts vertical rods or half rods 85e on the inner faces of the plunger portions 85b and further plunger rearward movement, as wedge-rod contact continues, results in the dogs 85d having been urged outwardly to the positions shown in FIG. 14, with the forward or side corners of the wedge 84c in contact with the inner face of the cam plate portions 85b, and with the rearward, or point edge of the wedge 84c is stopped contact with the plunger stop pin 92. At this point the draft pin 50 is at the rearward end of the slots 91.

In the forms of the invention carried over from the parent application, and also in the present invention, the piston 47 has only moved rearwardly some part of its travel at the point latching is accomplished with the draft pin 50 moved rearwardly to the rear ends of the slots 91, as aforesaid. Then, as in the preceding invention, further rearward movement of the piston 47 uncovers the mechanisms, first, to permit the vehicle to swing from side to side of the road with relation to the prime mover, or swing in deflection, second, to permit the vehicle to bump up and down, or move in angle of site or elevation with relation to the prime mover, and third, to permit the vehicle to careen transversely from side to side, or, if possible, to turn over and over about a longitudinal axis (of travel) extending directionally rearwardly behind the prime mover. Together, the three mechanisms comprise a universal connection between prime mover and drawn vehicle, but this can occur only when the hitch housing forward section 20a has been withdrawn rearwardly, as the piston 48 moves to the rearmost end of the hydraulic cylinder 41. As this occurs, the vehicle or vessel, as the house trailer or trailer home 88, whose receptacle 87 has first been latched by movement of the plunger 84 setting the dogs 85d, will be urged rearwardly as the forward hitch housing section 20a uncovers the universal joint mechanisms just behind the drawbar 13 of the prime mover 80, as has been hereinabove described.

With the prime mover and drawn vehicle latched, universally connected, and in transit, it can be desirable to prevent the prime mover 80 from becoming unlatched from the drawn object, while both are in transit. Such unlatching could occur, in the absence of safeguards, if, for instance, the handle of the valve 16 on the prime mover 80, should accidentally be turned, or jar loose, to dotted line position, FIG. 12. In order for transit to progress without danger or unlatching a drop latch 95 is shown in FIG. 12 pivoted at forward or handle part 95a of a pivot pin 99 across a bracket 100 that is mounted on top of the forward, upper surface of the rear hitch housing section 82. The head or latch bar 95b of the drop latch 95, when dropped, as will be hereinbelow described, falls into the forward part of the upper slot 91 to occupy position to block any forward movement of the draft pin 50 with relation to the hitch housing assembly 82, 20a, or 81. Then, since, with the valve handle of valve 16 inadvertently thrown to broken line position, FIG. 12, fluid now enters the rear end of the base of the hydraulic cylinder 41 through the hydraulic fluid conduit 14 and returns from the head of hydraulic cylinder 41 via the fluid return conduit 15, the piston 47 must be urged forwardly, and through the draft pin 50, drawing the whole hitch housing assembly 81 therewith, as well as the drawn vehicle 88 to which it is latched. The forward housing section 20a will thus be drawn forwardly, successively, over the spin, elevation, and deflection mechanisms, thus covering universal connection between prime mover and drawn object, whereby there is substantially rigidly latched relationship between prime mover and the vehicle therebehind.

This change to a substantially rigid connection between prime mover and drawn vehicle naturally results in progress being slowed or braked, and calls attention of the operator in the prime mover driver's seat that the valve 16 has slipped to reverse fluid flow direction. Consequently, he may turn the valve handle of the valve 16 back to full line position, leaving the drop latch 95 in dropped position. This results in the rigidly connected hitch housing assembly 81 and vehicle 88 being urged rearwardly together, as the forward hitch housing section 20a uncovers the successive three mechanisms comprising the universal joint assembly.

As shown in FIG. 12 the drop latch bar 95b carries a connection loop 95c on top thereof to which is connected a pull cord or wire 101. This wire 101 extends to a prime mover position in adjacency with the operator's position. Thus the operator released the cord or wire 101 that the drop latch bar or stop head 95b may pull into position in the upper slot 91 in the rear housing section 82, selectively, at time when the draft pin 50 is in contact with the rearward ends of the slots 91. Optionally the drop latch 95 may not rely altogether on gravity for its head 95b to fall in place, but any conventional triggering mechanism may be employed yieldably to hold the drop latch 95 in upper position, and, upon release of cord or wire 101, at driver's seat, to react to abet or trigger drop latch descent.

FIG. 15 illustrates rearrangement of components of a universal object, such as the one 33 shown in FIGS. 6 and 12, by which the 3° of movement: articulation, relative rocking vertically and side sway or rotation can be altered. Such rearrangements would permit selective removal of one or more of said degrees of movement by covering of the particular component with the hitch housing 20 in response to extension or retracton thereof.

Reference may be made to FIG. 16 which shows a prime mover, as a tractor 10, 80, carrying auxiliary line control valves 102 connected with RES. 103. The pairs of cylinder actuation, or similarly functioning flexible conduits 104a, 104b, FIG. 17, extend in laterally spaced apart relationship, each pair represented by a common line 104, FIG. 16, from respective control valve 102, with first interruption or connection break provision 105 shown between the tractor 10 and a first drawn vehicle or trailer home 23 or 88, respectively, (FIG. 1, FIG. 10), represented as 106a in FIG. 16.

A single auxiliary line (interruption) connection and disconnection unit 105 is shown in FIG. 17, comprising a flexible conduit 104a, and a flexible conduit 104b, each including a female connector 108 and a male connector 109. As shown, both female connectors 108 are mounted in parallel on a mounting bracket 110 and both male connectors 109 are mounted in parallel on a mounting bracket 111. These mounting brackets 110 and 111 are indicated diagrammatically in FIG. 16, between vehicles, in each case the female connector mounting bracket 110 being forwardly in direction of the prime mover, and the male connector mounting bracket 111 being rearwardly, as disposed at or to the front of a drawn vehicle 106a, 106b, 106c, and 106d. Also in FIG. 16, a hitch housing assembly 81, as shown in FIGS. 10–14, is shown extending rearwardly of each vehicle in the chain, to be projected for latched engagement with a female receptacle 87, flush with the front of each respective vehicle in chain immediately therebehind. These connectors 108 and 109 provide operating fluid to operate the respective hitch housing assemblies 81 simultaneously with engagement of the hitch housing assembly with its respective receptacle 87. They also permit interruption or disconnection simultaneously with disconnection of housing assembly 81 and receptacle 87.

Female connectors 108 and male connectors 109 are quick disconnect-type couplings well known in the art. As best seen in FIG. 19, the male connector 109 comprises a threaded body 112 with a nipple extension 113. The nipple extension 113 is provided with an annular groove 114 for receiving ball locks as will be more fully understood hereafter. The male connector 109 is also provided with an internal valve 115, which in the position of FIG. 19, prevents fluid from flowing therethrough.

The female connector 108 comprises a threaded body 116 to which a tubular latch body 117 is threadedly connected. Carried to tapered apertures 117a by the latch body 117 is a plurality of ball latches 118. The female coupling 108 is also provided with an internal valve 119 which prevents flow of fluid through the coupling when disconnected as in FIG. 19.

It will be noted that the respective valves 115 and 119 of the coupling members include piston portions 115a and 119a, respectively, which in the disconnected position of FIG. 19, sealingly engage a surrounding bore of the respective coupling to prevent fluid flow therethrough. Upon insertion of the male member 109 into the female member 108, the piston portions 115a and 119a come into contact. Since 119a is stationary, the piston 115a is forced against the biasing spring 115b, as shown in FIG. 18, to a position allowing flow around the piston and through the male coupling member 109. At the same time, the nipple portion 113 of the male coupling member contacts the surrounding insert 119b of the valve 119, forcing it to the position of FIG. 18, compressing the biasing spring 119c and allowing flow around the piston 119a through the female coupling member. In this position, ball locks 118 engage the locking groove 114 of the male member and a biased latching sleeve 120 slides over the balls, preventing their disengagement and preventing the disengagement of the coupling until the sleeve lock 120 is purposely and manually retracted.

FIG. 20 illustrates an embodiment in which a prime mover 121 is equipped with a hydraulic ram or cylinder 122 to which a housing assembly 81, as previously described may be mounted. Such mounting allows multiple position connection with a drawn vehicle 122. As shown in FIG. 20, the drawn vehicle 122 is provided with a pair of receptacles 87, one vertically spaced from the other, so that the connection could be made at either point.

A number of embodiments of the invention have been described herein. However, many other variations of the invention will be apparent from those skilled in the art without departing from the spirit of the invention. It is therefore intended that the scope of the invention be limited only by the claims which follow.

I claim:
1. Coupling apparatus for coupling first and second objects together for travel in tandem and including first coupling means carried by said first object and second coupling means carried by said second object:
    said second coupling means comprising second latch means;
    said first coupling means comprising:
        a universal joint assembly including an end component distal said first object and operative to permit pivotal movement of said end component with respect to said first object about three generally mutually perpendicular axes;
        a universal joint control assembly;
        one of said assemblies being connected to said first object; and
        an extendable mechanism longitudinally extendable from said first object and retractable toward said first object, said extendable mechanism including first latch means linked to said end component of said universal joint assembly and operative upon extension of at least a portion of said extendable mechanism to automatically engage said second latch means and thereby effect coupling of said first and second objects, said extendable mechanism further including the other of said assemblies, said other assembly having a first position with respect to said one assembly in which said universal joint assembly is locked against said pivotal movement and a second position with respect to said one assembly in which said universal joint assembly is freed for said pivotal movement, said other assembly being movable from said first position to said second position upon extension of said extendable mechanism; and
        drive means connected to said extendable mechanism for extending and retracting said extendable mechanism.

2. Coupling apparatus as set forth in claim 1 wherein said one assembly is said universal joint assembly and said other assembly is said universal joint control assembly.

3. Coupling apparatus as set forth in claim 2 wherein said universal joint control assembly comprises a rigid member having a portion disposed laterally adjacent said universal joint assembly in said first position; and wherein said extendable mechanism further comprises:
    at least one cam element carried by said rigid member, said cam element being longitudinally fixed but laterally movable with respect to said rigid member, said first latch means being, at least in part, carried by said cam element;
    latch control means connected to said drive means and extendable upon operation of said drive means longitudinally from said first object with respect to said rigid member and engageable with said cam element during such extension to laterally move said cam element and thereby engage said first and second latch means; and
    stop means cooperative between said latch control means and said rigid member to limit said extension of said latch control means with respect to said rigid member and thereby permit extension of said extendable mechanism as a unit upon further operation of said drive means to move said rigid member longitudinally away from said universal joint assembly to said second position.

4. Coupling apparatus as set forth in claim 3 wherein said rigid member is a housing member surrounding said universal joint assembly in said first position.

5. Coupling apparatus as set forth in claim 3 wherein said drive means is a piston and cylinder assembly having two elements relatively reciprocable longitudinally with respect to said objects, one of said reciprocable elements being attached to said end component of said universal joint assembly and the other of said reciprocable elements being attached to said latch control means.

6. Coupling apparatus as set forth in claim 3 wherein said first and second coupling means include interengageable alignment means, projecting as to one of said coupling means and receiving as to the other for aligning said first and second coupling means whereby said latch means can be engaged.

7. Coupling apparatus as set forth in claim 6 wherein said alignment means includes a male member on said first coupling means and a mating female member on said second coupling means.

8. Coupling apparatus as set forth in claim 7 wherein said male member is a rigid longitudinal extension of said rigid member.

9. Coupling apparatus as set forth in claim 6 wherein said alignment means includes a female member on said first coupling means and a mating male member on said second coupling means.

10. Coupling apparatus as set forth in claim 9 wherein said female member is a rigid longitudinal extension of said rigid member.

11. Coupling apparatus as set forth in claim 3 wherein said first and second latch means include interengageable means projecting as to one of said latch means and receiving as to the other of said latch means.

12. Coupling apparatus as set forth in claim 11 wherein said interengageable means on said first latch means includes at least one laterally directed male member and said interengageable means on said second latch means includes at least one mating female member.

13. Coupling apparatus as set forth in claim 9 including safety means operable upon malfunctioning of said operating means to prevent unlatching of said first and second coupling means.

14. Coupling apparatus as set forth in claim 13 wherein said safety means is carried by said first coupling means.

15. Coupling apparatus as set forth in claim 14 wherein said safety means comprises means for selectively locking said latch control means against retraction with respect to said rigid member whereby, upon reverse operation of said drive means, said extendable mechanism is retracted toward said first object as a unit and said rigid member is returned to said first position.

16. Coupling apparatus as set forth in claim 1 further comprising:
apparatus for coupling said second object to a third object for travel in tandem and including third coupling means substantially identical to said first coupling means carried by said second object and fourth coupling means substantially identical to said second coupling means carried by said third object;
a power source carried by said first object;
a first power transmission means carried by said first object and connected to said power source;
second power transmission means carried by said second object and connected to the drive means of said third coupling means;
means operatively associated with said first and second power transmission means for connecting said first and second power transmission means upon coupling of said first and second objects and disconnecting said first and second power transmission means upon uncoupling of said first and second objects.

17. Coupling apparatus as set forth in claim 16 including power transmission means and coupling means on said third object whereby said second and third objects are interchangeable.

18. Coupling apparatus as set forth in claim 16 further comprising:
third power transmission means carried by said first object and connected to said power source;
a movable mechanism on said second object;
fourth power transmission means carried by said second object and connected to said movable mechanism;
means operatively associated with said third and fourth power transmission means for connecting said third and fourth power transmission means upon coupling of said first and second objects and disconnecting said third and fourth power transmission means upon uncoupling of said first and second objects.

19. Coupling apparatus for coupling first and second objects together for travel in tandem including first coupling means carried by one of said objects for operative engagement with second coupling means carried by the other of said objects: said first coupling means comprising a universal joint assembly with respective components adapted to permit articulation, relative rocking vertically, and side sway or rotation about an axis of travel; an extendable member connected to said universal joint assembly and including latch means engageable with corresponding latch means carried by said second coupling means to effect latching together of said first and second objects; and operating means connected to said extendable member for extension in relation to said universal joint assembly to allow said articulation, relative rocking and side sway of said universal joint asssembly and for retraction to another position transforming said universal joint assembly to a substantially rigid connection between said objects; and safety means carried by said first coupling means and operable upon malfunctioning of said operating means to prevent unlatching of said first and second coupling means, in which said safety means is operable upon said malfunction to effect said transformation of said universal joint assembly to said substantially rigid connection.

20. Coupling apparatus for coupling first and second objects together for travel in tandem including first coupling means carried by one of said objects for operative engagement with second coupling means carried by the other of said objects: said first coupling means comprising a universal joint assembly with respective components adapted to permit articulation, relative rocking vertically, and side sway or rotation about an axis of travel; an extendable member connected to said universal joint assembly and including latch means engageable with corresponding latch means carried by said second coupling means to effect latching together of said first and second objects; and operating means connected to said extendable member for extension in relation to said universal joint assembly to allow said articulation, relative rocking and side sway of said universal joint assembly and for retraction to another position transforming said universal joint assembly to a substantially rigid connection between said objects; said apparatus further including third coupling means carried by said second object and fourth coupling means carried by a third object for latching said second and third objects together for travel in tandem, said third coupling means including operating means for effecting said latching of said second and third objects, said third coupling means operating means being operatively connected to a control line which is simultaneously interruptable with the unlatching of said third and fourth coupling means.

21. Coupling apparatus for coupling first and second objects together for travel in tandem including first coupling means carried by one of said objects for operative engagement with second coupling means carried by the other of said objects: said first coupling means comprising a universal joint assembly with respective components adapted to permit articulation, relative rocking vertically, and side sway or rotation about an axis of travel; and extendable member connected to said universal joint assembly and including latch means engageable with corresponding latch means carried by said second coupling means to effect latching together of said first and second objects; and operating means connected to said extendable member for extension in relation to said universal joint assembly to allow said articulation, relative rocking and side sway of said universal joint assembly and for retraction to another position transforming said universal joint assembly to a substantially rigid connection between said objects; in which said universal joint assembly comprises components selectively engageable by said extendable member to permit one or more of said movements of articulation, relative rocking, and side sway, depending upon the arrangement of said components.

* * * * *

UNITED STATES PATENT AND TRADEMARK OFFICE
CERTIFICATE OF CORRECTION

PATENT NO. : 3,981,517
DATED : September 21, 1976
INVENTOR(S) : Gerald J. Crochet, Sr.

It is certified that error appears in the above-identified patent and that said Letters Patent are hereby corrected as shown below:

Column 17, line 9, "9" should be -- 2 --.

Signed and Sealed this

Twenty-third Day of November 1976

[SEAL]

Attest:

RUTH C. MASON
*Attesting Officer*

C. MARSHALL DANN
*Commissioner of Patents and Trademarks*